United States Patent
Hagiwara et al.

(10) Patent No.: US 7,021,339 B2
(45) Date of Patent: Apr. 4, 2006

(54) BRAKE HOSE FOR MOTOR VEHICLE

(75) Inventors: Hideki Hagiwara, Tokyo (JP); Tatsuya Kaito, Tokyo (JP); Tomoya Ishii, Tokyo (JP); Akira Uno, Tokyo (JP); Hisashi Ohkubo, Tokyo (JP); Hideki Horikoshi, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 7 days.

(21) Appl. No.: 10/497,075

(22) PCT Filed: Jun. 13, 2003

(86) PCT No.: PCT/JP03/07570

§ 371 (c)(1),
(2), (4) Date: Nov. 2, 2004

(87) PCT Pub. No.: WO03/106878

PCT Pub. Date: Dec. 24, 2003

(65) Prior Publication Data
US 2005/0051227 A1    Mar. 10, 2005

(30) Foreign Application Priority Data
Jun. 14, 2002 (JP) ............................. 2002-174130

(51) Int. Cl.
*F16L 11/10* (2006.01)
(52) U.S. Cl. ............... 138/123; 138/124; 138/137; 138/141; 138/126
(58) Field of Classification Search ........ 138/123–126, 138/137, 140, 141; 428/36.1
See application file for complete search history.

(56) References Cited

U.S. PATENT DOCUMENTS

| 3,866,632 | A | | 2/1975 | Schaffer ................... 138/130 |
| 3,982,982 | A | * | 9/1976 | Chudgar ................... 156/143 |
| 4,111,237 | A | * | 9/1978 | Mutzner et al. ........... 138/125 |
| 4,273,160 | A | | 6/1981 | Lowles ..................... 138/124 |
| 4,384,595 | A | * | 5/1983 | Washkewicz et al. ....... 138/127 |
| 4,420,018 | A | * | 12/1983 | Brown, Jr. ................ 138/124 |
| 5,526,848 | A | * | 6/1996 | Terashima et al. ......... 138/125 |
| 5,826,623 | A | * | 10/1998 | Akiyoshi et al. .......... 138/126 |
| 6,220,304 | B1 | * | 4/2001 | Horiba et al. ............. 138/126 |
| 6,626,211 | B1 | * | 9/2003 | Mizutani et al. .......... 138/126 |
| 6,807,988 | B1 | * | 10/2004 | Powell et al. ............. 138/125 |

FOREIGN PATENT DOCUMENTS

| JP | 57-76383 | 5/1982 |
| JP | 60-21081 | 2/1985 |
| JP | 64-789 | 1/1989 |

* cited by examiner

*Primary Examiner*—Patrick Brinson
(74) *Attorney, Agent, or Firm*—McGinn IP Law Group, PLLC

(57) ABSTRACT

A vehicle brake hose has inner tube rubber layer 1, first and second braided fiber reinforcing layers 2, 3 that are provided outside the inner tube rubber layer 1, and an outer tube rubber layer 5 that is provided outside the second braided fiber reinforcing layer 3. The first braided fiber reinforcing layer 2 is tightly braided and the second braided fiber reinforcing layer 3 is loosely braided. The first and second braided fiber reinforcing layers 2, 3 are bonded through an adhesion layer 4 to the outer tube rubber layer 5.

5 Claims, 7 Drawing Sheets

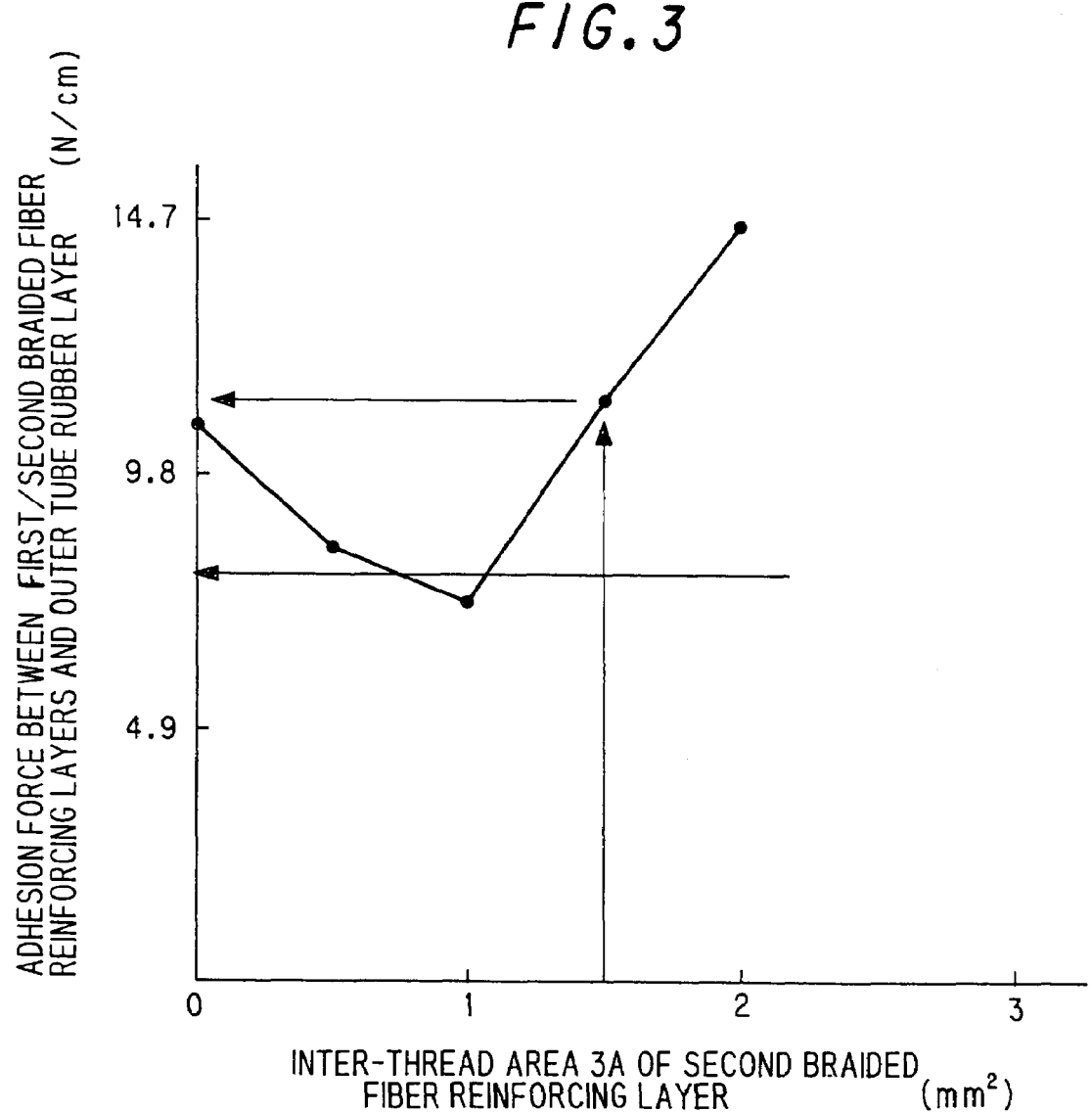

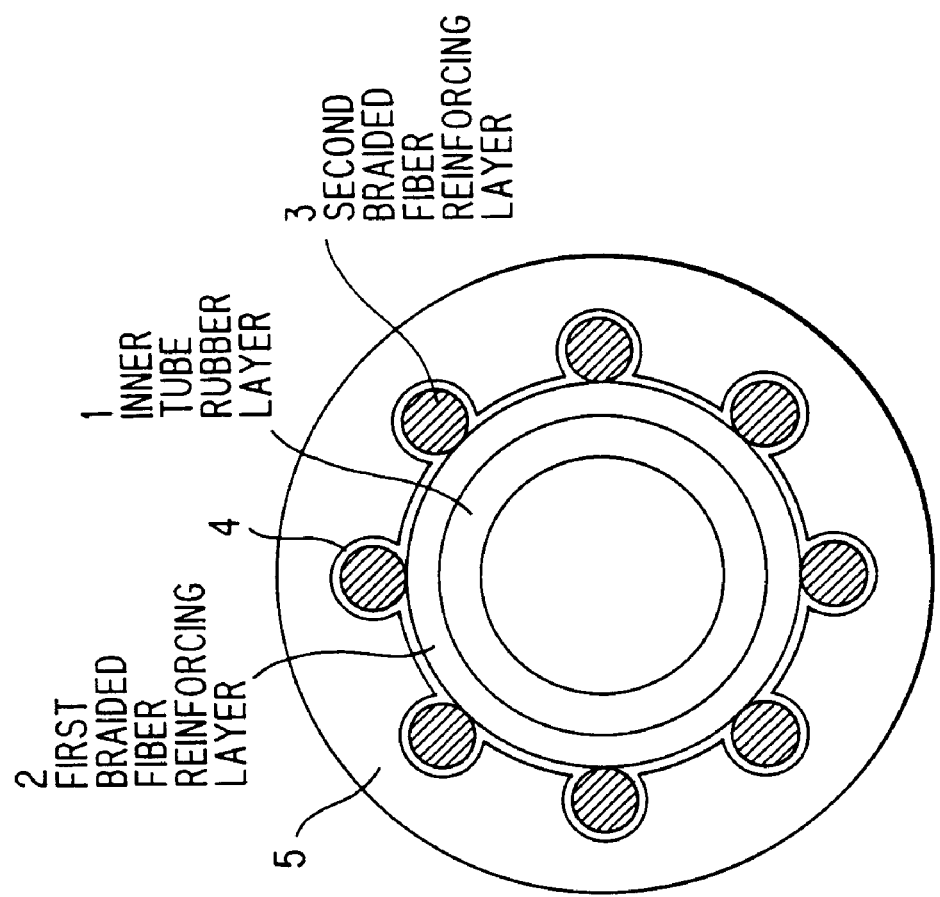
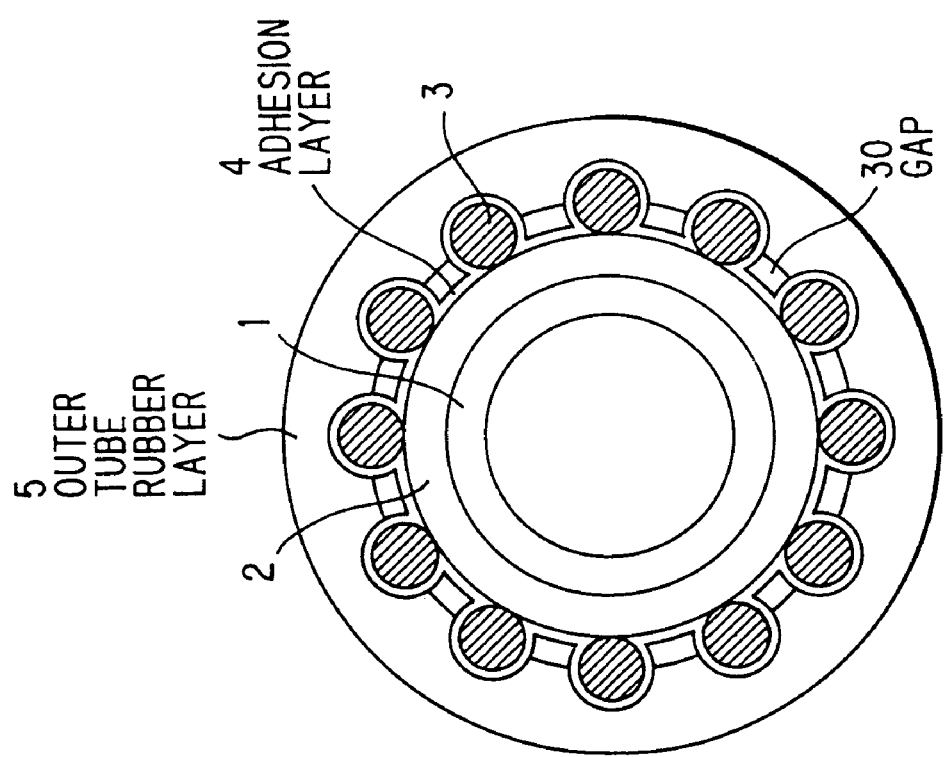

BRAKE HOSE FOR MOTOR VEHICLE

The present application is based on Japanese patent application No. 2002-17130, the entire contents of which are incorporated herein by reference.

TECHNICAL FIELD

This invention relates to a vehicle brake hose that is used for a braking device in a vehicle such as automobile and motorcycle.

BACKGROUND ART

FIG. 1 shows a conventional brake hose. The conventional brake hose 20 is composed of an inner tube rubber layer 1 that has a hose hole 1A formed inside to be filled with brake fluid and that is of ethylene-propylene-diene rubber, a first braided fiber reinforcing layer 2 that is formed on the periphery of the inner tube rubber layer 1 and that is made braiding fibers of high tenacity rayon, polyester fibers, nylon fibers, alamido fibers etc., a second braided fiber reinforcing layer 9 that is formed through a middle rubber layer 8 of natural rubber on the periphery of the first braided fiber reinforcing layer 2, and an outer tube rubber layer 5 that is formed on the periphery of the second braided fiber reinforcing layer 9 and that is of chloroprene rubber etc.

The reason why the middle rubber layer 8 is provided is that it prevents the rubbing between fibers of the first braided fiber reinforcing layer 2 and the second braided fiber reinforcing layer 9 so as to enhance the durability. In case of not having the middle rubber layer 8, the hose may be broken since the braided fibers are abraded by rubbing each other due to the pressuring, bending or meandering motion generated during using it so that the strength of fibers lowers.

There is also provided an adhesive layer between the second braided fiber reinforcing layer 9 and the outer tube rubber layer 5 to satisfy the performance required in various standards, such as JIS D2601 "automobile parts/non-mineral oil series fluid brake hose assembly" and, especially, to enhance the sealing performance between hose and fitting to satisfy "brake fluid suitability".

Furthermore, according to the standards of JIS D2601, it is regulated that a vehicle brake hose has more than two fiber layers.

The vehicle brake hose is subjected to various limitations described above and, in recent years, it is desired that the weight of brake hose is reduced to lower the manufacturing cost and to advance environment measures.

However, in the conventional brake hose, when the amount of material used is simply reduced so as to reduce the weight of brake hose and to lower the manufacturing cost, the performance, especially durability, regulated by the JIS standards could not be maintained.

Also, when the amount of material used is reduced, the amount of hose expansion that highly influences the braking force and brake feeling could be increased.

On the other hand, in the layout designing of brake hose when developing the vehicle, the brake hose is disposed in a narrow and tight region because of the enlarging of engine room, the enhancement of suspension performance and braking force etc. Therefore, it is desired that the rigidity of brake hose is reduced to facilitate the installation of brake hose.

DISCLOSURE OF INVENTION

It is an object of the invention to provide a vehicle brake hose that satisfies a predetermined durability, a lowered expansion amount and a reduced rigidity while lowering the manufacturing cost and the weight.

According to first aspect of the invention, a vehicle brake hose comprises:

an inner layer;

a first braided fiber reinforcing layer and a second braided fiber reinforcing layer that are provided outside the inner layer; and wherein the first braided fiber reinforcing layer and the second braided fiber reinforcing layer are bonded through an adhesion layer to the outer layer, and the second braided fiber reinforcing layer has a braid density lower that of the first braided fiber reinforcing layer.

Since the braid of first braided fiber reinforcing layer is tightly braided and the braid of second braided fiber reinforcing layer is loosely braided, the second braided fiber reinforcing layer serves to reinforce the first braided fiber reinforcing layer. Thus, the strength of first braided fiber reinforcing layer can be enhanced. As a result, the middle rubber layer can be removed and the amount of thread used (in the second braided fiber reinforcing layer) can be reduced, and therefore the weight of entire brake hose can be reduced.

Also, since the adhesion layer is provided between the outer layer and the first braided fiber reinforcing layer and the second braided fiber reinforcing layer, the first and second braided fiber reinforcing layers and the outer layer are integrated. Since the three layers are integrally moved, the brake hose can be provided that has an enhanced strength, a lowered expansion amount and a reduced rigidity.

It is preferred that the second braided fiber reinforcing layer has a braid density lower that of the first braided fiber reinforcing layer such that an adhesion force between the outer layer and the first braided fiber reinforcing layer and the second braided fiber reinforcing layer is 9.8 N/cm or greater.

Since the braid of second braided fiber reinforcing layer is tightly braided, the braid of first braided fiber reinforcing layer is exposed between braided threads of the second braided fiber reinforcing layer, and the outer layer thereby closely contacts the first and second braided fiber reinforcing layers. Thus, strength to meet the JIS standards etc. can be obtained.

It is preferred that the first braided fiber reinforcing layer is composed of a braid with an inter-thread area of 1 mm$^2$ or less, and the second braided fiber reinforcing layer is composed of a braid with an inter-thread area of 1.5 mm$^2$ or greater.

Since the braid of second braided fiber reinforcing layer is tightly braided, the braid of first braided fiber reinforcing layer is exposed between braided threads of the second braided fiber reinforcing layer. By increasing the inter-thread area of second braided fiber reinforcing layer, it becomes easy to make the outer layer closely contact the first and second braided fiber reinforcing layers. Thus, the adhesion force can be enhanced.

According to second aspect of the invention, a vehicle brake hose comprises:

an inner layer;

a first braided fiber reinforcing layer and a second braided fiber reinforcing layer that are provided outside the inner layer; and wherein the second braided fiber reinforcing layer has a braid density lower that of the first braided fiber reinforcing layer, and the first braided fiber reinforcing layer and the second braided fiber reinforcing layer are composed of a fiber that is treated with resorcinol-formaldehyde-latex (RFL).

Since the fiber composing the first and second braided fiber reinforcing layer is treated with RFL, the adhesion layer can be removed and the brake hose can have a smaller diameter. Even then, the adhesion force between the outer layer and the first and second braided fiber reinforcing layers does not lower.

According to third aspect of the invention, a vehicle brake hose comprises:

an inner layer;

a first braided fiber reinforcing layer that is provided outside the inner layer;

a second braided fiber reinforcing layer that is provided outside the first braided fiber reinforcing layer while contacting directly the first braided fiber reinforcing layer; and an outer layer that is provided outside the second braided fiber reinforcing layer;

wherein the first braided fiber reinforcing layer and the second braided fiber reinforcing layer are bonded through an adhesion layer to the outer layer, and the second braided fiber reinforcing layer has a braid density lower that of the first braided fiber reinforcing layer such that the adhesion layer is formed directly contacting a braid of the first braided fiber reinforcing layer being exposed between braided threads of the second braided fiber reinforcing layer.

BRIEF DESCRIPTION OF DRAWINGS

The preferred embodiments according to the invention will be explained below referring to the drawings, wherein:

FIG. 3 is a graph showing the relationship of inter-thread area 3A of second braided fiber reinforcing layer and an adhesion force between first/second braided fiber reinforcing layers and outer tube rubber layer;

FIGS. 5A and 5B each are cross sectional views showing cases that the second braided fiber reinforcing layer has a narrow inter-thread area 3A and that it has a wide inter-thread area 3A;

BEST MODE FOR CARRYING OUT THE INVENTION

A vehicle brake hose in a preferred embodiment according to the invention will be explained below.

The brake hose of the invention is composed such that the middle rubber layer lying between the first braided fiber reinforcing layer and the second braided fiber reinforcing layer is removed. By forming an adhesion layer on the periphery of the second braided fiber reinforcing layer being loosely braided, as a result, the adhesion layer is also formed on the periphery of the first braided fiber reinforcing layer that is exposed between braided fibers of the second braided fiber reinforcing layer. Therefore, the contact area between the outer tube rubber layer and the first braided fiber reinforcing layer and the second braided fiber reinforcing layer becomes equal to that of the conventional brake hose. With a suitable adhesion area, an adhesion force between the outer tube rubber layer and the first braided fiber reinforcing layer and the second braided fiber reinforcing layer becomes greater than 9.8 N/cm, which is required to a brake hose.

Also, since the second braided fiber reinforcing layer is bound by the outer tube rubber layer, the movement of second braided fiber reinforcing layer can be restrained even when the middle rubber layer is removed. Thus, the brake hose has durability equal to or greater than the conventional brake hose.

Figure 4A:
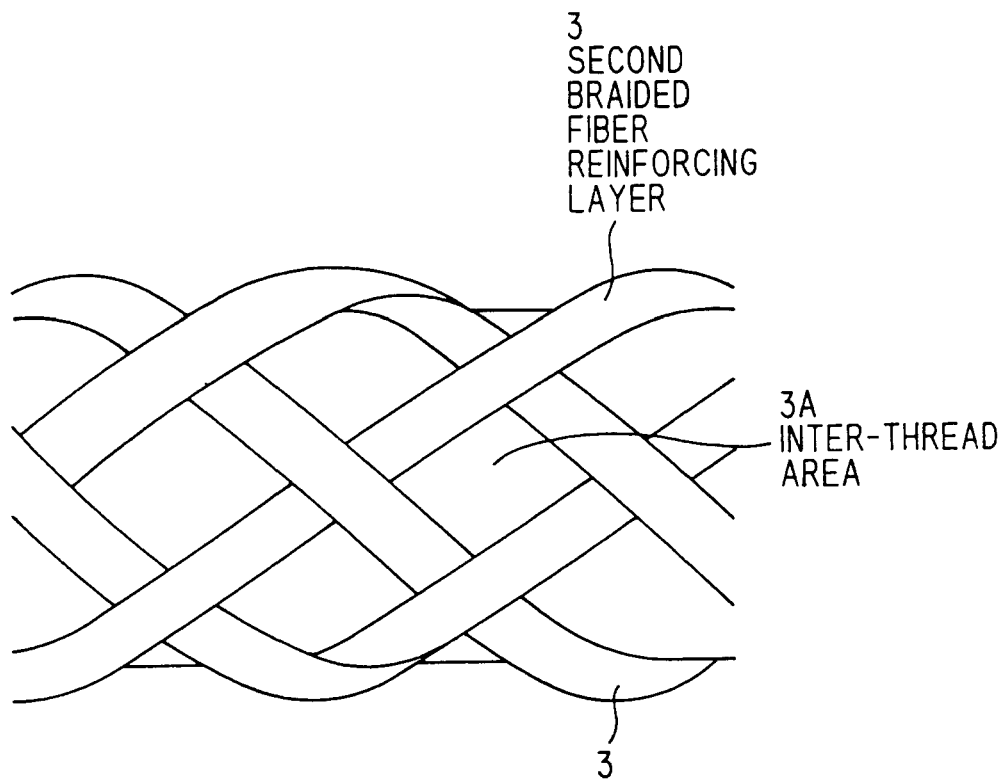
FIGS. 4A and 4B each are a plain view and a cross sectional view showing a brake hose before forming an adhesion layer.
Figure 4B:
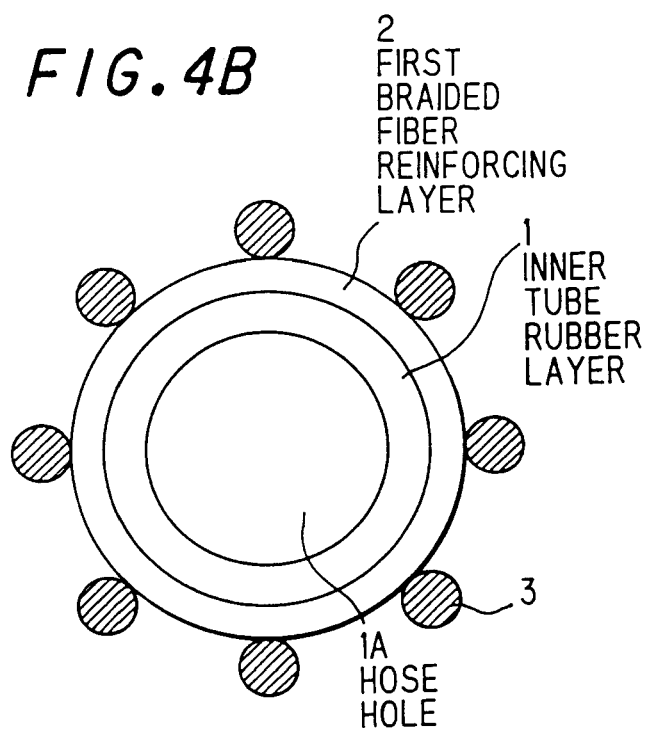

The brake hose in the embodiment is explained with reference to FIG. 3 to FIG. 5. FIG. 3 is a graph showing the relationship of inter-thread area 3A of second braided fiber reinforcing layer and an adhesion force between first and second braided fiber reinforcing layers and outer tube rubber layer. FIGS. 4A and 4B each are a plain view and a cross sectional view showing a brake hose before forming an adhesion layer. Meanwhile, in FIG. 4A, the first braided fiber reinforcing layer 2 is omitted. FIG. 5A is a cross sectional view showing a brake hose having a second braided fiber reinforcing layer 3 with a narrow inter-thread area 3A defined between braided threads. FIG. 5B is a cross sectional view showing a brake hose having a second braided fiber reinforcing layer 3 with a wide inter-thread area 3A defined between braided threads.

Depending on an inter-thread area (3A in FIG. 4A) defined between braided threads in the second braided fiber reinforcing layer 3, the adhesion force between the outer rubber layer 4 and the first braided fiber reinforcing layer 2 and the second braided fiber reinforcing layer 3 changes. The adhesion force continues lowering until the inter-thread area 3A defined between braided threads in the second braided fiber reinforcing layer 3 becomes about 1 mm$^2$. However, when it becomes 1 mm$^2$ or greater, the adhesion force rises. When is 1.5 mm$^2$ or greater, the adhesion force becomes 9.8 N/cm or greater (See FIG. 3).

In case of a narrow inter-thread area 3A defined between braided threads in the second braided fiber reinforcing layer 3, when the adhesion layer 4 is formed on the periphery of the second braided fiber reinforcing layer 3 and is then covered with the outer tube rubber layer 5, the outer tube rubber layer 5 does not flow into between braided threads in the second braided fiber reinforcing layer 3, so that there is formed a gap 30 between the outer tube rubber layer 5 and the periphery of first braided fiber reinforcing layer 2. Therefore, the adhesion of the outer tube rubber layer 5 and the first braided fiber reinforcing layer 2 and the second braided fiber reinforcing layer 3 becomes insufficient and the adhesion force therebetween lowers. Accordingly, when the brake hose is subjected to pressuring, bending and meandering, the second braided fiber reinforcing layer 3 is significantly moved, so that the first braided fiber reinforcing layer 2 and the second braided fiber reinforcing layer 3 are rubbed and abraded each and, thereby, the durability lowers.

In case of a wide inter-thread area 3A defined between braided threads in the second braided fiber reinforcing layer 3, the outer tube rubber layer 5 flows into between braided threads in the second braided fiber reinforcing layer 3, so that the outer tube rubber layer 5 closely contacts the periphery of first braided fiber reinforcing layer 2. Therefore, the adhesion force between the outer tube rubber layer 5 and the first braided fiber reinforcing layer 2 and the second braided fiber reinforcing layer 3 becomes sufficiently strong. Accordingly, even when the brake hose is subjected to pressuring, bending and meandering, the second braided fiber reinforcing layer 3 is bound by the outer tube rubber layer 5 and, therefore, the first braided fiber reinforcing layer 2 and the second braided fiber reinforcing layer 3 are not rubbed each other. As a result, the durability does not lower.

If the adhesion force between the outer tube rubber layer 5 and the first braided fiber reinforcing layer 2 and the second braided fiber reinforcing layer 3 lowers to less than 9.8 N/cm, the brake fluid suitability test based on JIS D2601 cannot be satisfied. Namely, there may occur a leakage of brake fluid.

Figure 6A:
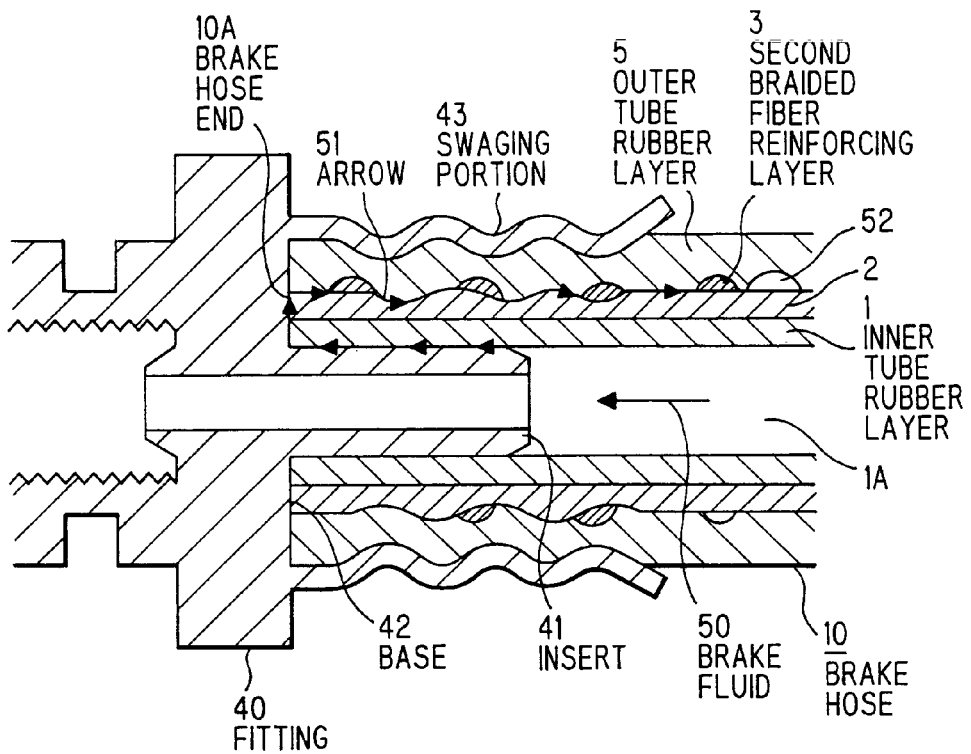
FIGS. 6A and 6B each are illustrations showing the process of generating a leakage of brake fluid.
Figure 6B:
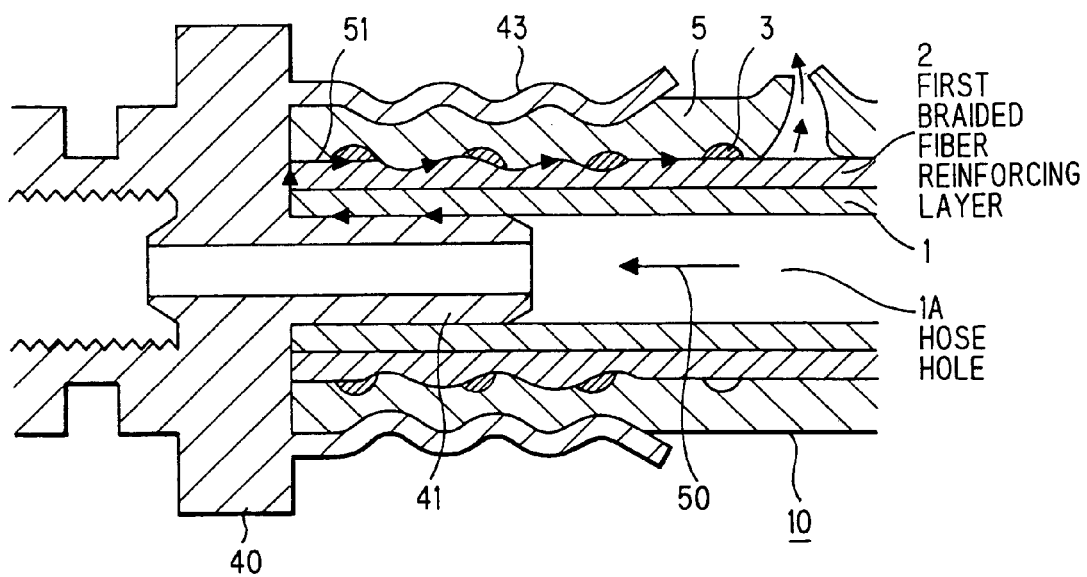

FIG. 6A shows a route through which brake fluid penetrates during the installation of brake hose, and FIG. 6B shows the state of generating a leakage of brake fluid.

In installing the brake hose, a hose hole 1A of inner tube rubber 1 of brake hose 10 is fitted to an insert portion 41 of fitting 40 and the brake hose 10 is inserted until its brake hose end 10A reaches a base 42 of the insert portion 41. Then, a swaging portion 43 of the fitting 40 is swaged by using a swaging machine (not shown) etc. such that the brake hose 10 is connected with the fitting.

In this case, if the adhesion force of the outer tube rubber layer 5 and first braided fiber reinforcing layer 2 and the second braided fiber reinforcing layer 3 is weak, brake fluid 50 penetrates, as shown by arrows 51, into a gap between the outer tube rubber layer 5 and first braided fiber reinforcing layer 2 and the second braided fiber reinforcing layer 3. When the brake fluid accumulates to some extent (as shown by numeral 52) and the pressure increases, the breaking of outer tube rubber layer 5 may occur due to a shock etc. applied to the outer tube rubber layer 5.

In this embodiment, by increasing the adhesion force between the outer tube rubber layer 5 and the first braided fiber reinforcing layer 2 and the second braided fiber reinforcing layer 3, the abrasion between the first braided fiber reinforcing layer 2 and the second braided fiber reinforcing layer 3 can be deduced. Therefore, even without the middle rubber layer, a sufficient durability can be offered.

Furthermore, since the middle rubber layer is removed, the outer diameter of brake hose 10 can be further reduced. In addition, since the outer tube rubber layer 5 is integrally bonded to the first braided fiber reinforcing layer 2 and the Second braided fiber reinforcing layer 3 and, thereby, they are integrally moved, the rigidity can be reduced and the expansion amount can be lowered.

EXAMPLE

Figure 1:
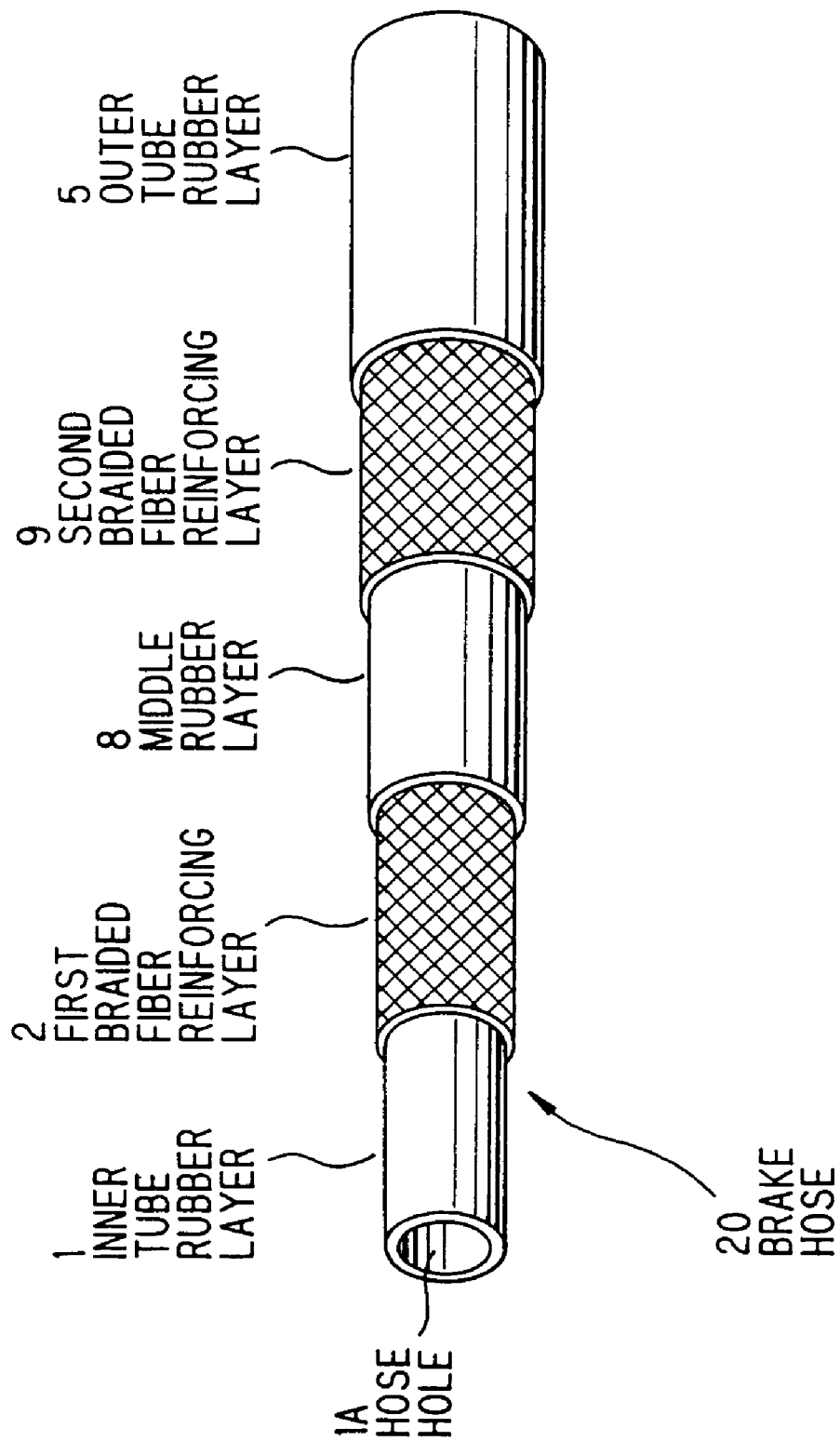
FIG. 1 shows the conventional brake hose.
Figure 2:
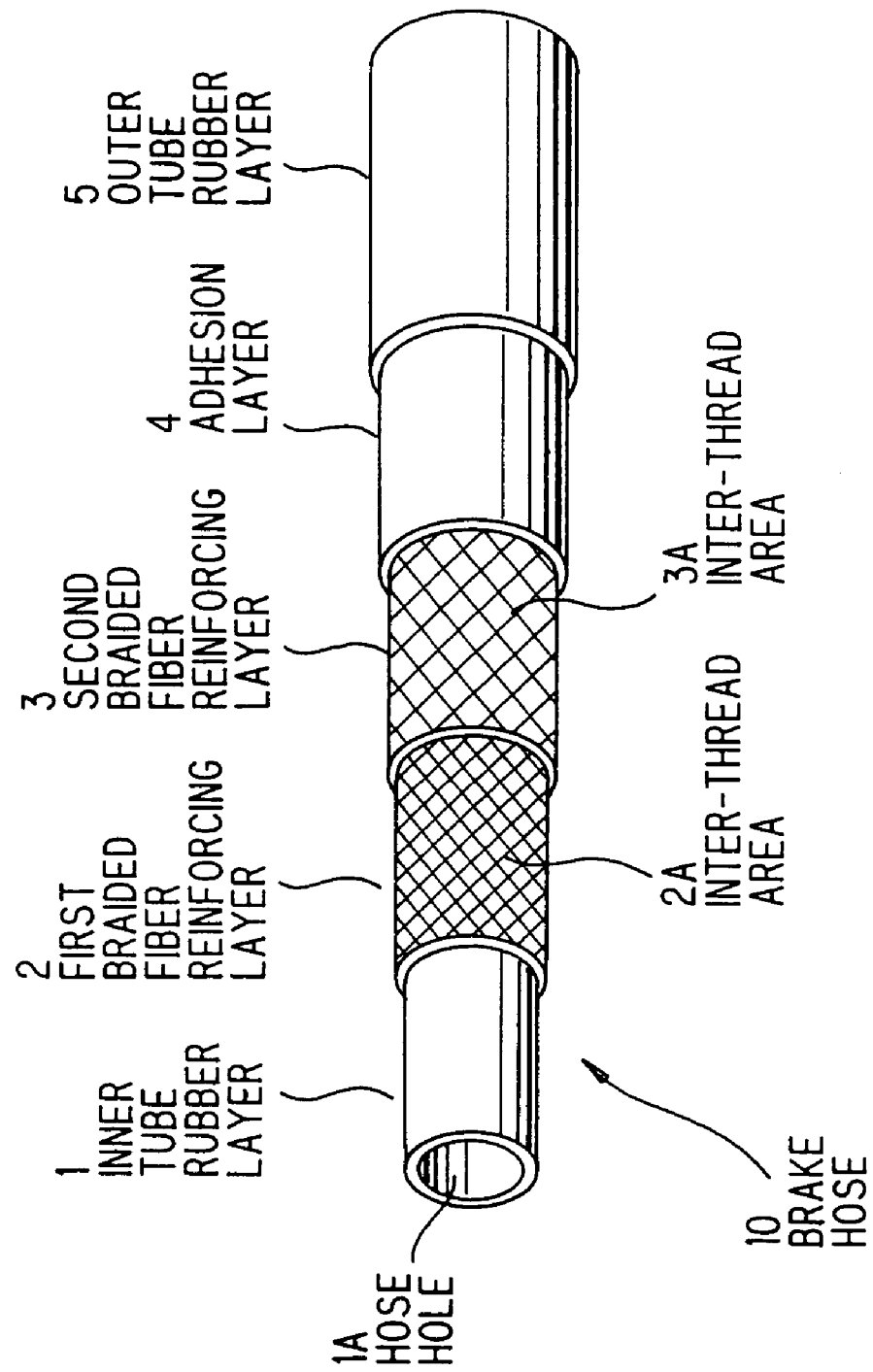
FIG. 2 shows a brake hose according to the invention.

FIG. 2 shows an example of vehicle brake hose according to the invention. The vehicle brake hose 10 is composed of the inner tube rubber layer 1, the first braided fiber reinforcing layer 2 formed on the periphery of the outer tube rubber layer 1, the second braided fiber reinforcing layer 3 formed on the periphery of the first braided fiber reinforcing layer 2, and the outer tube rubber layer 5 formed through the adhesion layer 4 on the periphery of the second braided fiber reinforcing layer 3.

The inner tube rubber layer 1 is of ethylene-propylene rubber (EPDM) and is provided with the hose hole 1A to have an inner diameter of 3.3 mm. The thickness of inner tube rubber layer 1 is 0.3 mm or greater.

The inner tube rubber layer 1 may be of styrene rubber (SBR), butyl rubber (IIR), nitrile rubber (butyl rubber) (NBR), chloroprene rubber (CR) or a blend thereof, other than EPDM.

The first braided fiber reinforcing layer 2 is formed using two vinylon fibers of 1000 deniers, which are tightly braided by using a braiding machine with 24 carriers. In this case, the inter-thread area 2A is 0.1 to 0.5 mm².

The second braided fiber reinforcing layer 3 is formed using one vinylon fiber of 1000 deniers, which is loosely braided at an interval of two carriers, with 12 carriers, by using the braiding machine with 24 carriers. In this case, the inter-thread area 3A is 1.5 mm².

The braid angel (slope of fiber to hose axis) in braiding is a static angle of 54° 44', which is such an angle that the fiber braid does not extend when an inner pressure is applied to the brake hose.

With respect to the second braided fiber reinforcing layer 3, although, in this embodiment, the inter-thread area 3A of braid is adjusted by the number of carriers (12 carriers), the following four adjustments are possible.

(1) Adjustment by increasing/decreasing the denier number of fiber.
(2) End number of fiber (in this embodiment, two ends for first braided fiber reinforcing layer 2 and one end for second braided fiber reinforcing layer 3).
(3) Carrier number of fiber (in this embodiment, 24 carriers for first braided fiber reinforcing layer 2 and 12 carriers for second braided fiber reinforcing layer 3) (the carrier number of second braided fiber reinforcing layer 3 may be one or more)
(4) Braid angle (in this embodiment, a static angle of 54° 44').

Although the first braided fiber reinforcing layer 2 and second braided fiber reinforcing layer 3 are formed using vinylon fiber (PVA), they may be formed using polyester series fiber (PET, PEN etc.), nylon, rayon etc.

The adhesion layer 4 is coated on the periphery of second braided fiber reinforcing layer 3 while being liquidized by dissolving EPDM with solvent. In this case, since the periphery of first braided fiber reinforcing layer is exposed between the second braided fiber reinforcing layer, it is also coated on the periphery of first braided fiber reinforcing layer.

The adhesion layer 4 may be of SBR, IIR, NBR, CR, natural rubber or a blend thereof. Although in this embodiment it is liquidized by dissolving with solvent, it may be formed into a sheet and is then wrapped on the periphery of second braided fiber reinforcing layer to cover it. Also, a thermo-setting resin commercially available may be used.

Further, with an enhanced treating agent, resorcinol-formaldehyde-latex (RFL) to be formed in thread for the purpose of adhesion, the adhesion can be removed. RFL may be of SBR, butadiene rubber (BR), CR, hypalon (CSM) or a blend thereof.

The outer tube rubber layer 5 may be of SBR, IIR, NBR, CR or a blended rubber or resin thereof, other than EPDM.

The vehicle brake hose thus composed is brought to the brake fluid suitability test (based on JIS D2601) and the high-temperature meandering test while comparing with a conventional example.

Figure 7:
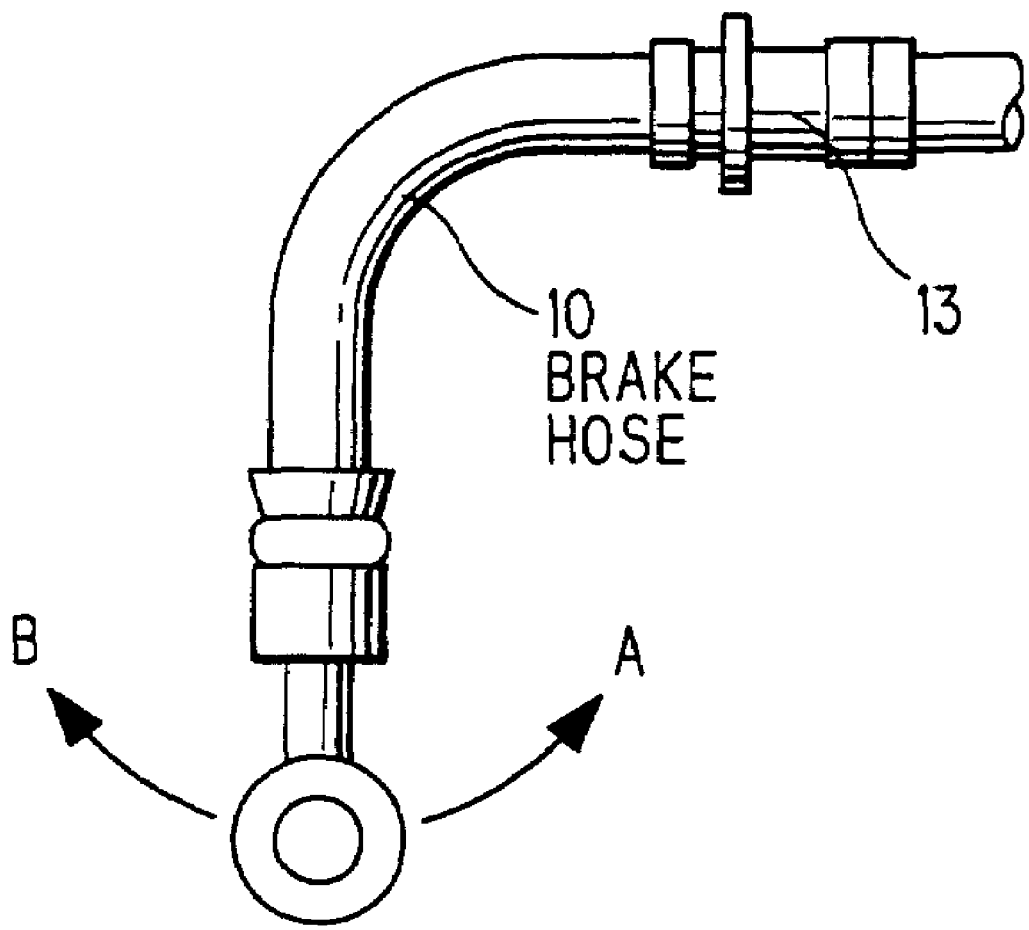
FIG. 7 shows the state of high-temperature meandering test.

FIG. 7 shows the state of conducting the high-temperature meandering test. The tested material, brake hose 10 is repeatedly meandered in the directions of arrows A and B while fixing a portion indicated by numeral 13. This test is conducted under conditions of a pressure of 100 kgf/cm² and a atmosphere temperature of 100° C. for samples of the conventional example and the example of the invention.

Table 1 shows the results of brake fluid suitability test and high-temperature meandering test on the conventional example, the example of the invention and comparative examples 1, 2.

TABEL 1

| | Hose Specification | | | | | | | | | | Evaluation Test | | |
|---|---|---|---|---|---|---|---|---|---|---|---|---|---|
| | First braided fiber reinforcing layer | | | | | Second braided fiber reinforcing layer | | | | | brake | | high- |
| | fiber | denier number | carrier number | end number | inter-thread area ($mm^2$) | middle rubber layer | fiber | denier number | carrier number | end number | inter-thread area ($mm^2$) | adhesion force (*1) | fluid suitability (*2) | expansion (*3) | temperature meandering (repeat count) (*4) |
| Conventional | Vinylon | 1000 | 2 | 24 | 0.1~0.5 | present | Vinylon | 1000 | 3 | 24 | 0.1~0.5 | 9.8 | ○ | 0.54 | 500,000 |
| Embodiment | Vinylon | 1000 | 2 | 24 | 0.1~0.5 | absent | Vinylon | 1000 | 1 | 12 | 1.5 | 9.8 | ○ | 0.36 | 700,000 |
| Comparative Example 1 | Vinylon | 1000 | 2 | 24 | 0.1~0.5 | absent | Vinylon | 1000 | 3 | 24 | 0.1~0.5 | 9.8 | ○ | 0.88 | 100,000 |
| Comparative Example 2 | Vinylon | 1000 | 2 | 24 | 0.1~0.5 | absent | Vinylon | 1000 | 1 | 12 | 1 | 735 | X | 0.65 | 150,000 |

(*1): adhesion force between first braided fiber reinforcing layer and second braided fiber reinforcing layer
(*2): brake fluid suitability test based on JIS D2601; hose is filled with brake fluid and is subjected to aging at 120° C. for 72 hours. after aging, a hydraulic pressure of 27.6 MPa is applied thereto and it is confirmed whether a defect exists or not; ○: no defect; X: defect existing
(*3): expansion test based on JIS D2601; expansion amount of hose is measured when applying 6.9 MPa to hose.
(*4): high-temperature meandering test; repeat count of meandering until the breaking of hose.

It is proved that the embodiment of the invention satisfies the brake fluid suitability and that, in the high-temperature meandering test, it has a significantly enhanced durability as compared to the conventional example.

INDUSTRIAL APPLICABILITY

According to the invention, a vehicle brake hose is provided that satisfies a predetermined durability, a lowered expansion amount and a reduced rigidity while lowering the manufacturing cost and the weight.

What is claimed is:

1. A vehicle brake hose, comprising:
an inner layer;
a first braided fiber reinforcing layer and a second braided fiber reinforcing layer that are provided outside the inner layer; and
wherein the first braided fiber reinforcing layer and the second braided fiber reinforcing layer are bonded through an adhesion layer to an outer layer, and the second braided fiber reinforcing layer has a braid density lower that of the first braided fiber reinforcing layer.

2. The vehicle brake hose according to claim 1, wherein:
the second braided fiber reinforcing layer has a braid density lower that of the first braided fiber reinforcing layer such that an adhesion force between the outer layer and the first braided fiber reinforcing layer and the second braided fiber reinforcing layer is 9.8 N/cm or greater.

3. The vehicle brake hose according to claim 1, wherein:
the first braided fiber reinforcing layer is composed of a braid with an inter-thread area of 1 $mm^2$ or less, and the second braided fiber reinforcing layer is composed of a braid with an inter-thread area of 1.5 $mm^2$ or greater.

4. A vehicle brake hose, comprising:
an inner layer;
a first braided fiber reinforcing layer and a second braided fiber reinforcing layer that are provided outside the inner layer; and
wherein the second braided fiber reinforcing layer has a braid density lower that of the first braided fiber reinforcing layer, and the first braided fiber reinforcing layer and the second braided fiber reinforcing layer are composed of a fiber that is treated with resorcinol-formaldehyde-latex (RFL).

5. A vehicle brake hose, comprising:
an inner layer;
a first braided fiber reinforcing layer that is provided outside the inner layer;
a second braided fiber reinforcing layer that is provided outside the first braided fiber reinforcing layer while contacting directly the first braided fiber reinforcing layer; and
an outer layer that is provided outside the second braided fiber reinforcing layer;
wherein the first braided fiber reinforcing layer and the second braided fiber reinforcing layer are bonded through an adhesion layer to the outer layer, and the second braided fiber reinforcing layer has a braid density lower that of the first braided fiber reinforcing layer such that the adhesion layer is formed directly contacting a braid of the first braided fiber reinforcing layer being exposed between braided threads of the second braided fiber reinforcing layer.

* * * * *